US008175619B2

(12) United States Patent
Filizola et al.

(10) Patent No.: US 8,175,619 B2
(45) Date of Patent: May 8, 2012

(54) METHOD AND SYSTEM FOR DETERMINING WHETHER A TERMINAL BELONGS TO A TARGET SPACE IN A COMMUNICATION NETWORK, RELATED NETWORK AND COMPUTER PROGRAM PRODUCT

(75) Inventors: Davide Filizola, Turin (IT); Dario Parata, Turin (IT); Emanuele Grimani, Turin (IT)

(73) Assignee: Telecom Italia S.p.A., Milan (IT)

( * ) Notice: Subject to any disclaimer, the term of this patent is extended or adjusted under 35 U.S.C. 154(b) by 849 days.

(21) Appl. No.: 11/665,077

(22) PCT Filed: Oct. 15, 2004

(86) PCT No.: PCT/IB2004/003372
§ 371 (c)(1),
(2), (4) Date: Apr. 11, 2007

(87) PCT Pub. No.: WO2006/040611
PCT Pub. Date: Apr. 20, 2006

(65) Prior Publication Data
US 2009/0023461 A1      Jan. 22, 2009

(51) Int. Cl.
*H04W 4/02*     (2009.01)
*G06Q 99/00*    (2006.01)

(52) U.S. Cl. .................... 455/456.3; 455/456.5; 705/1.1

(58) Field of Classification Search ............... 455/414.2, 455/440, 456.1–457; 340/988–996; 342/450–465; 705/1.1
See application file for complete search history.

(56) References Cited

U.S. PATENT DOCUMENTS

| | | | | |
|---|---|---|---|---|
| 6,236,365 | B1 * | 5/2001 | LeBlanc et al. | 342/457 |
| 2001/0022558 | A1 * | 9/2001 | Karr et al. | 342/450 |
| 2003/0146871 | A1 * | 8/2003 | Karr et al. | 342/457 |
| 2003/0186710 | A1 * | 10/2003 | Muhonen et al. | 455/456.5 |
| 2003/0222820 | A1 * | 12/2003 | Karr et al. | 342/457 |
| 2004/0058691 | A1 | 3/2004 | Filizola et al. | |
| 2004/0198386 | A1 * | 10/2004 | Dupray | 455/456.1 |
| 2004/0203841 | A1 * | 10/2004 | Bayder | 455/456.1 |

(Continued)

FOREIGN PATENT DOCUMENTS
EP      0 631 453 A2      12/1994
(Continued)

OTHER PUBLICATIONS

Adusei et al.; "Mobile Positioning Technologies in Cellular Networks: An Evaluation of Their Performance Metrics"; IEEE Military Communications Conference, vol. 1 of 2, pp. 1239-1 244, (2002).*

(Continued)

*Primary Examiner* — Kent Chang
*Assistant Examiner* — Kashif Siddiqui
(74) *Attorney, Agent, or Firm* — Finnegan, Henderson, Farabow, Garrett & Dunner, L.L.P.

(57) ABSTRACT

The system allows determining whether at least one terminal belongs to a target space in a communications network in order to provide a set of services linked to the fact that the terminal belongs or does not belong to the above target space. The belonging is determined depending on at least one determination parameter. The services are associated with, preferably through a model, respective service specifications indicating the allowable error margin in determining whether the terminal belongs or does not belong to the target space. The determination parameters are changed depending on the above service specifications.

22 Claims, 6 Drawing Sheets

U.S. PATENT DOCUMENTS

| | | | |
|---|---|---|---|
| 2004/0203926 A1* | 10/2004 | Ruutu et al. | 455/456.1 |
| 2004/0266457 A1* | 12/2004 | Dupray | 455/456.5 |
| 2005/0003835 A1* | 1/2005 | Riise et al. | 455/456.3 |
| 2005/0136845 A1* | 6/2005 | Masuoka et al. | 455/67.14 |
| 2006/0276201 A1* | 12/2006 | Dupray | 455/456.1 |
| 2008/0113672 A1* | 5/2008 | Karr et al. | 455/456.1 |
| 2008/0167049 A1* | 7/2008 | Karr et al. | 455/456.2 |

FOREIGN PATENT DOCUMENTS

| | | |
|---|---|---|
| EP | 631453 A2 * | 12/1994 |
| EP | 1 239 685 A1 | 9/2002 |
| WO | WO-02/085049 A1 | 10/2002 |
| WO | WO-03/049479 A1 | 6/2003 |
| WO | WO-2004/004372 A1 | 1/2004 |

OTHER PUBLICATIONS

Adusei et al.; "Mobile Positioning Technologies in Cellular Networks: An Evaluation of Their Performance Metrics"; IEEE Military Communications Conference, vol. 1 of 2, pp. 1239-1244, (2002).

3rd Generation Partnership Project; Technical Specification Group Core Network; Universal Geographical Area Description (GAD) (Release 5); 3GPP TS 23.032 V5.0.0. pp. 1-29, (2003).

* cited by examiner

Fig_1
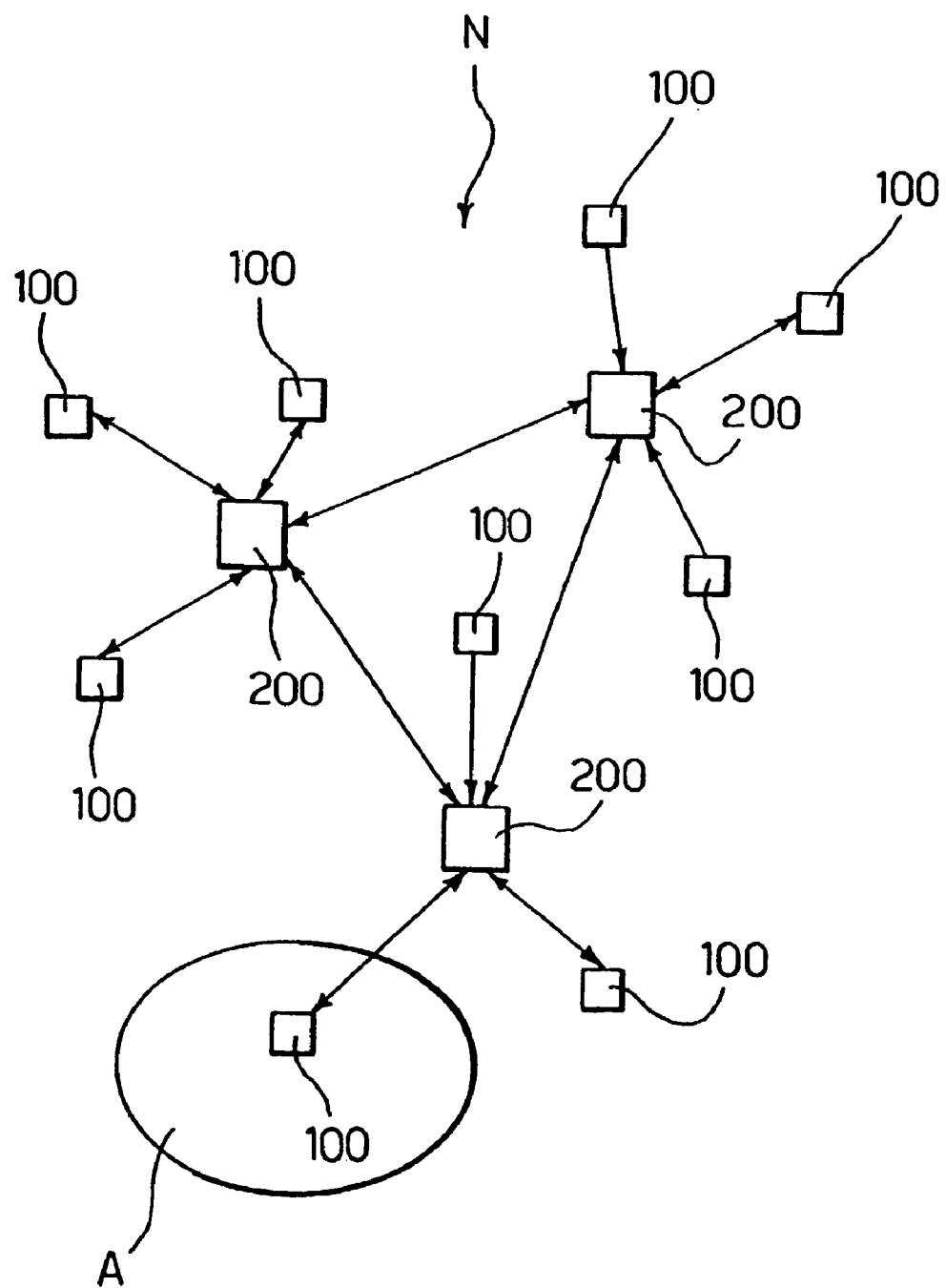

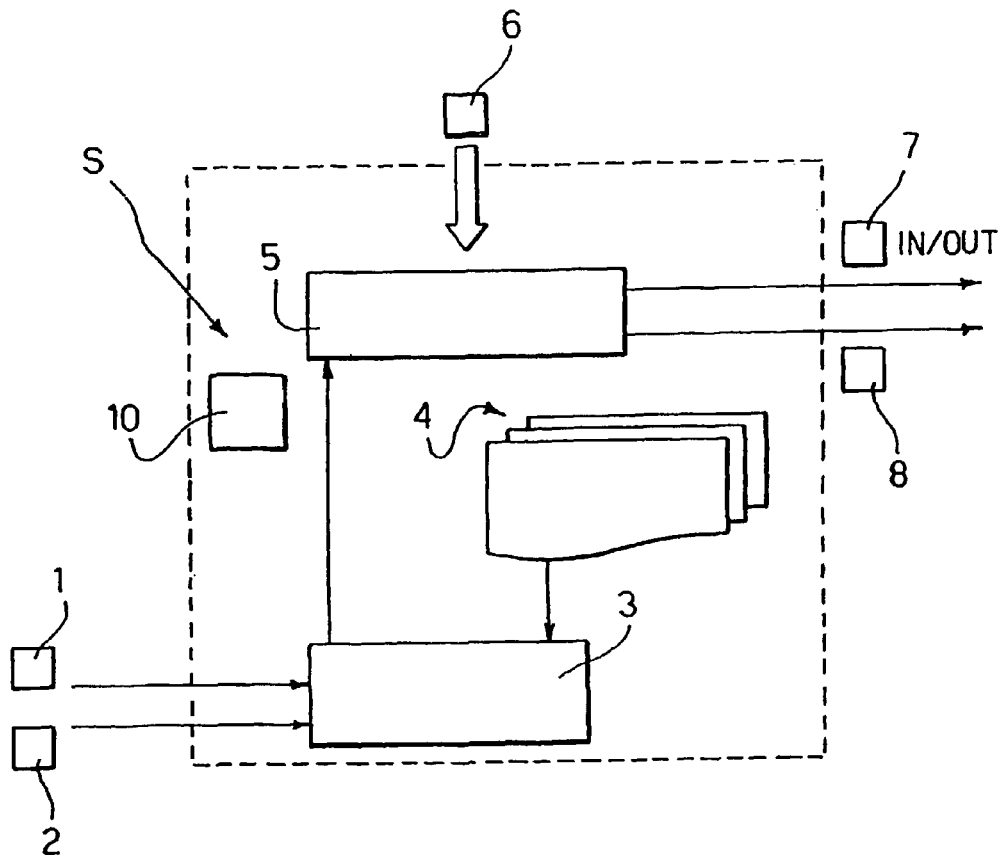
Fig_2
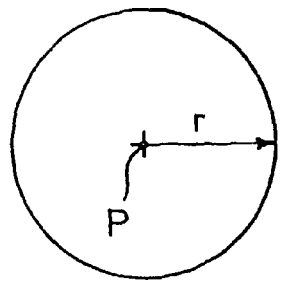
Fig_3

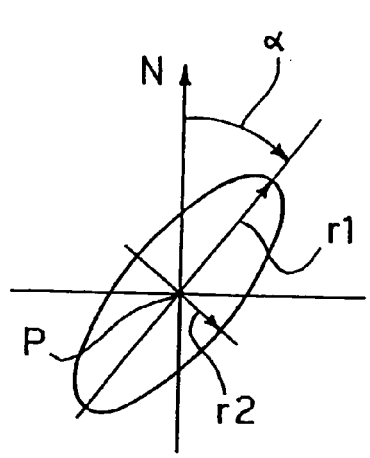
Fig._4
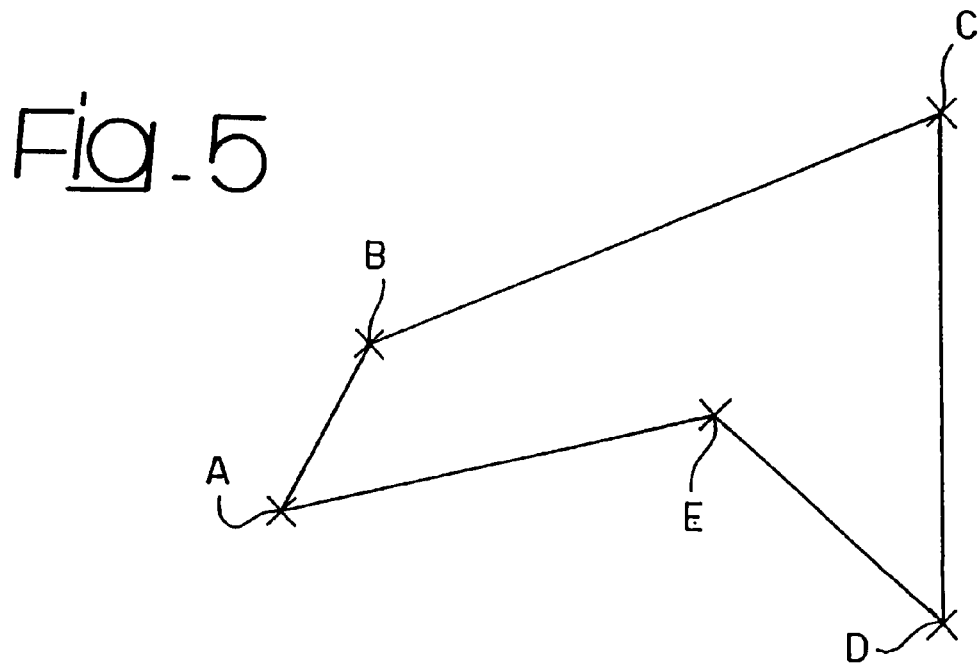
Fig._5
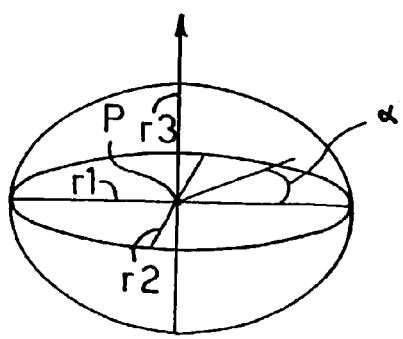
Fig._6

Fig_7
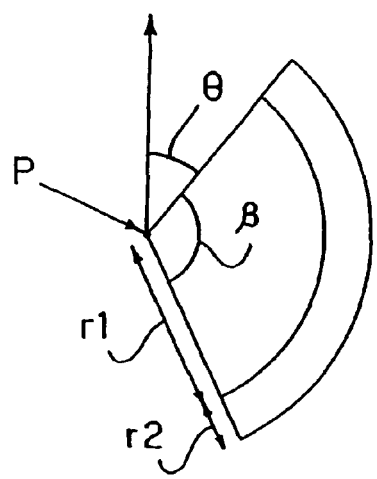
Fig_8
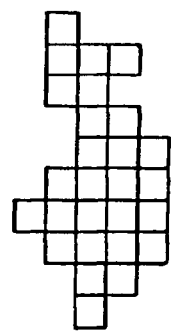
Fig_9
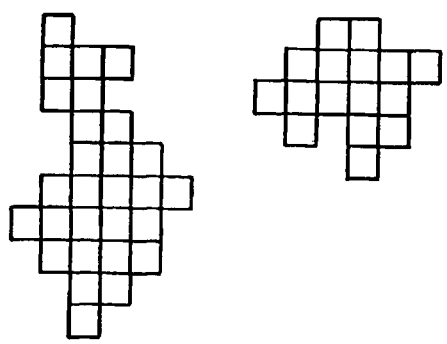

Fig_10
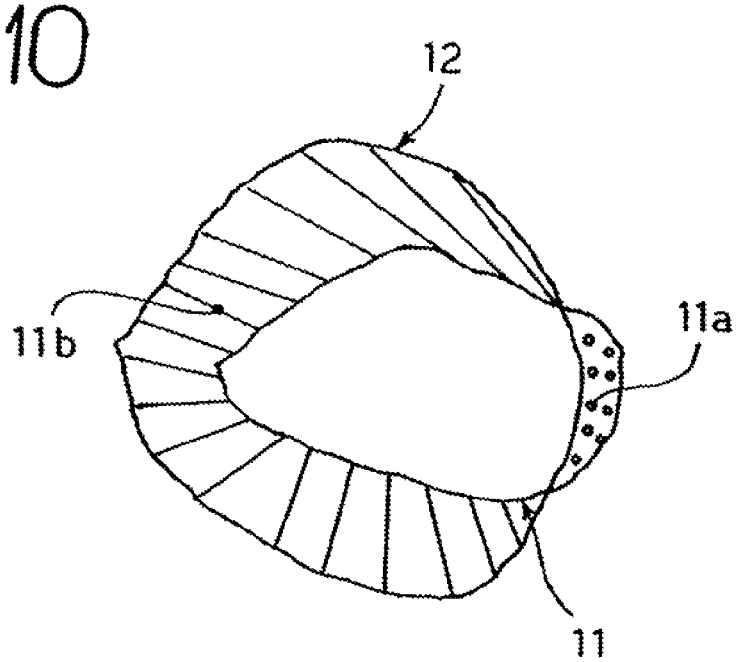
Fig_11
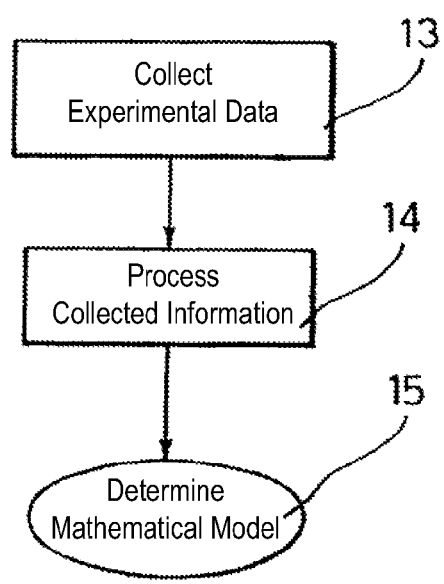

Fig_12
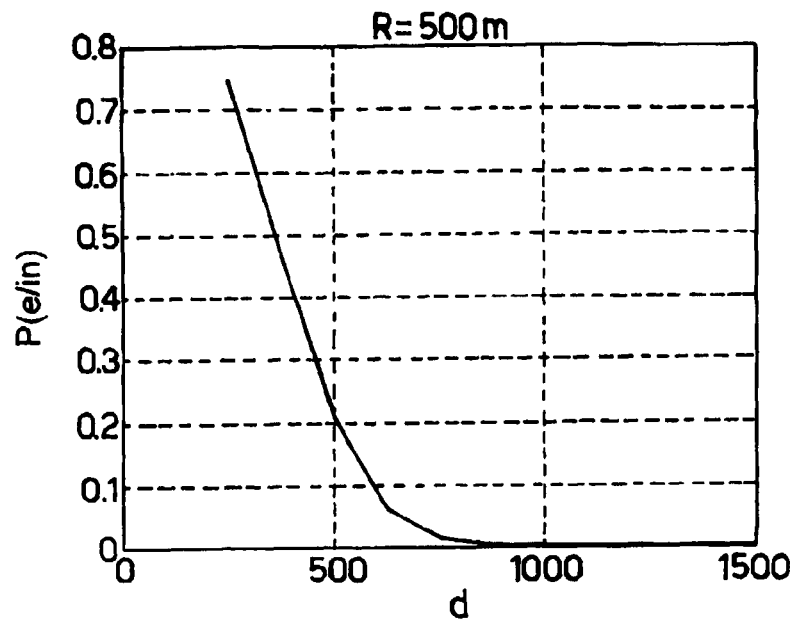
Fig_13
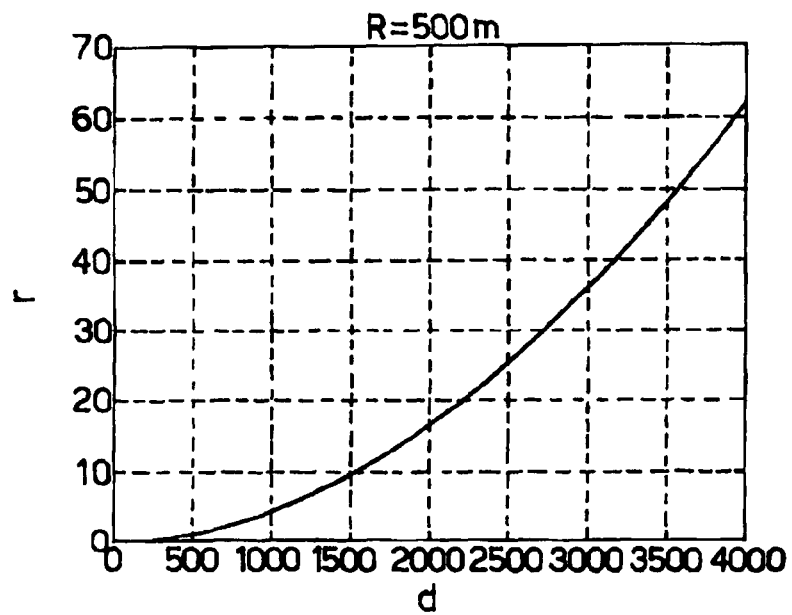

METHOD AND SYSTEM FOR DETERMINING WHETHER A TERMINAL BELONGS TO A TARGET SPACE IN A COMMUNICATION NETWORK, RELATED NETWORK AND COMPUTER PROGRAM PRODUCT

CROSS REFERENCE TO RELATED APPLICATION

This application is a national phase application based on PCT/IB2004/003372, filed Oct. 15, 2004, the content of which is incorporated herein by reference.

FIELD OF THE INVENTION

The present invention refers to the techniques that allow checking whether a terminal belongs to a target space in a communications network, namely, for example, establishing whether a given user terminal is in a certain area, called "target" area.

DESCRIPTION OF THE PRIOR ART

In these latest years, with the capillary spreading of mobile communication networks, the user interest in location-based services has grown. Such services are currently called "Location Based Services" or, briefly, LBS.

New types of location-based services have therefore appeared: as an example, the following can be cited: services for supplying information (services like "Yellow Pages" from which a user can obtain information about interesting places near him) and user assistance services (for example emergency services, so that the user calls are located and routed towards the nearest assistance centre).

Among the location-based services, those services depending on the area in which a user can be found are widely relevant. These types of services do not need the accurate user location, and instead need less detailed information: whether a user belongs to a given geographical area, also called "target" area.

Some examples of these services are included below:

areas with different fares: the mobile network operator or manager can offer, to business or private users, reduced fares for calls generated from or aimed to a defined geographic area. For example, a company can therefore have reduced fares available for calls performed from within and to the business area, while a private person can, always as an example, have reduced fares for calls performed near his home. Or the mobile network operator or manager can offer, to business or private users, increased fares in certain critical areas.

providing commercials or "advertising": advertising information (for example, possible discounts) that are customised depending on user profile and user position within the communication network. The user can configure his own profile by pointing out which are the advertising information in which he is interested and the period in which the service must be active. The subject that provides the advertising information can circumscribe the area in which information are broadcast;

safety: it can happen when an object goes out of a certain area deemed as safe. For example, the safe area can correspond to the area of a school attended by a child and the object can be a mobile phone carried by the child;

passage between different networks; on mixed networks (for example UMTS/WLAN) there is a high bit-rate network for some limited areas (for example WLAN network) and a lower bit-rate network that covers bigger service areas (for example UMTS). Big service areas contain those with high bit-rate, that have a more limited extension, namely a coverage area. The terminal is normally connected to the network with greater coverage and lower bit-rate, and when it enters in the areas covered by the higher bit-rate networks, it connects thereto. Under these situations, it is desired to detect when the terminal goes in or out of the areas covered by the higher bit-rate network.

Essentially, there are two types of systems that are subjected to determine whether a user belongs to a given "target" area.

In the first type of systems, the user position is estimated by means of a certain location method and afterwards it is evaluated whether the estimated coordinates belong to a prefixed area (for example as disclosed in EP-A-1 239 685).

This type of solution can be generally applied whichever the chosen location method is. The choice can happen, for example, among the location methods known in literature, such as:

GPS (Global Positioning System),
E-OTD (Enhanced Observed Time Difference),
OTDOA (Observed Time Difference of Arrival).

Moreover, the position estimation can be carried out with the system disclosed in WO 03/049479-A1.

The above-cited second type of systems does not aim to establish the spot where the terminal can be found and therefore does without a real location action. These systems check a series or radio-electrical parameters (for example power of signal received from radio-base stations) and/or network parameters (for example, server cell identification). Whether a terminal belongs or not to a given area is estimated based on these parameters.

Systems of this type are disclosed in WO 2002/085049 and WO 2004/004372. Systems of this type will be herein below called "localised triggers".

Though being able to provide ad indication whether a user belongs or not to a "target" area, all these known systems and processes anyway have a limited degree of accuracy. This results in a non-null event probability value, so that the user, though being outside the target area is estimated as being inside, or in such event that a user that is actually present inside is estimated outside. Obviously, the mentioned probabilities can also operate so that the user placement inside or outside the target area is correctly signalled, but only with a certain delay with respect to when the relevant event (user entry or exit with respect to the target area) occurred.

The probabilities of the two above-mentioned events, that should be both low, are however as a trend linked by a different link; therefore, when the former decreases, the latter tends to increase and vice versa.

In general terms, the known technologies are configured in the same way whichever the type or rendered service is depending on whether one belongs or not to the target area or space.

The Applicant has however become aware that this way of operating can be unsatisfactory, since uncertainties and/or delays (and, in general, accuracy) of a location technique can have different weights for different services.

The Applicant in particular observed the occurrence of problems in some types of services.

For example, for a safety service linked to the check whether the terminal remains in a given "target" area, the indication that the terminal went outside the given "target" area can be provided not immediately, but only with a certain delay.

This situation (terminal signalled inside the "target" area when it is actually outside it) can be unacceptable for the relevant service, while some "false positive" or "false alarm", namely a (wrong) signal that the terminal should have left the target area while instead it is still inside it, could be allowed.

As a complement, for an access control service, the indication that the terminal has entered the "target" area cannot be provided immediately, but only with a certain delay.

This situation (terminal signalled outside the target area when it is actually inside) can be unacceptable, while some (wrong) signals would be allowed that the terminal should have entered the "target" area while instead it is still outside the area itself.

Moreover, the Applicant observed that, within a given type of service, different cases must often be managed.

For example, in case of application of an increased fare in a certain critical area, it is important that the higher fare is applied only if one is really sure that the user is in the "target" area. In this case no situations are allowed in which the user is outside and is detected as inside. It can instead be allowed that a lower fare is applied to the user that is actually present in the "target" area but that has been detected as outside.

A similar situation, but with opposite requirements, occurs when a reduced fare is applied in a given area. In this case, it is important that the higher fare is applied only if one is really sure that the user is outside the "target" area for applying the reduced fare. In this case no situations are allowed in which the user is inside and is detected as outside. It can instead be allowed that a lower fare is applied to the user, even if he is actually outside the "target" area, but is detected as being inside.

As a further example, in the advertising field, it can be desirable that the probability of the event with a user outside the "target" area detected as inside the target" area is low while a higher probability of the event with a user inside the "target" area detected as outside the "target" area. Concretely, it can be difficult to tolerate that a user that accidentally passes with his car near a relevant spot (restaurant, commercial centre, cinema, fuel station, etc.) receives advertisements related to the relevant spot itself: such advertisements being prone to be both useless and annoying. In such case, instead, it is allowable that, if the user actually enters the "target" area, his entry is detected with a certain delay, thereby making, for a certain interval of time, though being inside the "target" area, the user detected outside the "target" area so that he does not receive any advertisement.

In general, for some services, it is not allowed that a user outside the "target" area is detected as inside the "target" area, while it can be allowed that, though being inside the "target" area, he is detected as outside the "target" area. On the contrary, in other types of services, no conditions are allowed for which the user inside the "target" area is detected as outside the "target" area while it can be allowable that, though being outside the "target" area, he is detected as inside the "target" area.

In terms of delay, for some services, no delays are allowed in detecting the entry (or exit) into certain areas, while false detections can be tolerated. On the contrary, in other types of services, no false detections are allowed and delays can be tolerated.

OBJECT AND SUMMARY OF THE INVENTION

The Applicant has discovered that the known localisation systems, and in particular those that have been mentioned previously, do not allow the best management of these different needs, linked to the type of service.

More specifically, from the previous description of the current situation, the Applicant has detected and dealt with the problem of having available techniques that, in checking whether a mobile terminal belongs to a certain "target" area, can—correctly—take into account the different weight that inaccuracies/delays can have according to the rendered service.

Object of the present invention is satisfying the above-mentioned need.

According to the present invention, this object is obtained by means of a method whose characteristics are included in the following claims. The present invention also deals with a corresponding system, a network comprising such system, in addition to an information product that can be loaded in the memory of at least one processor and comprising portions of software code in order to perform the above method. As used herein, the reference to such an information product is meant as equivalent to the reference to means that can be read by a processor containing instructions for controlling a processor system in order to coordinate the performance of the method according to the invention. The reference to "at least one processor" is aimed to enlighten the chance that the present invention is enacted in a distributed and/or modular way.

Specific features of the invention are defined in the following claims, that are in all respects an integral part of the present description.

A possible embodiment of the invention is aimed to determine whether at least one terminal belongs to a "target" space (for example a certain area) in a communications network. This in order to provide a set of services linked to the fact that the terminal belongs or not to the target space. Whether the terminal belongs is determined depending on at least one determination parameter (in particular the determination parameter for belonging to the "target" space) linked to the adopted location technology, which can be of any type. The herein described method provides for associating to the services respective service specifications (P(e|out), P(e|in); P(e|in), r) indicative of the allowable error margin in determining whether a certain terminal belongs or not to the "target" space. The determination parameter or parameters are then changed depending on service specifications.

The relevant specifications can correspond, for example, to:
 i) the probability (P(e|out)) that the terminal (100), placed outside the target space (A), is wrongly detected as placed inside the target space (A);
 ii) the probability (P(e|in)) that the terminal (100), placed inside the target space (A), is wrongly detected as placed outside said target space (A).

Always as an example, another possible choice of service specifications corresponds to:
 i) the probability (P(e|in)) that the terminal (100), placed inside the target space (A), is wrongly detected as placed outside said target space (A);
 ii) the ratio (r) between the size of the space detected as belonging to the target space (A) and the actual size of the target space (A).

In a particularly preferred way, the above service specifications are determined as model (such as a mathematical model).

The herein described arrangement allows determining whether a user (or a mobile terminal) belongs to a given "target" area, with a preferred, but not exclusive, application sector composed of radio-mobile networks.

In a particularly preferred embodiment, the herein described arrangement provides for the use, as input data, of:

definition of a "target" area. The "target" area can have any shape and is defined by taking into account that one or more of the provided services are different depending on the user position with respect to the area (in/out);

service specifications related to the accuracy in recognising the user position with respect to the "target" area. The specifications allow reaching, for example, a right compromise between the need of recognising the user inside the "target" area, when he actually is inside the area, and the need of recognising him outside, when the user is outside the area.

For example, it is possible to choose the best compromise between:

the need of having a low probability that the user is in the "target" area and is recognised as out;

the need of having a low probability that the user is out of the "target" area and is recognised as in.

As already stated, both probabilities cannot be null and typically when one decreases, the other increases. The herein described arrangement allows adapting to the specifications of the relevant service choosing the right balance between the two needs.

The definition of the "target" area can occur in various ways. For example, if the area is a circle, it is enough to provide the centre coordinates and the radius length. Obviously any other type of "target" area can be taken into account and any specification criteria of the "target" area can be used.

The accuracy specifications can be different for different "target" areas. This makes the herein described arrangement different from the known technologies that satisfy fixed accuracy specifications.

In the detailed description, that follows, of an embodiment of the invention, some mathematic indicators will be described, through which it is possible to define the above accuracy specifications.

The output is represented by trigger events (entry or exit detection events) and/or by information about the presence of a user or an object inside the "target" area.

The described arrangement provides for the use of any location technology among the various available ones and therefore it is in no way linked to the choice of a specific technology. The location function is therefore subjected to being implemented with any one of the known location and localised trigger methods or through the methods described below.

The herein described arrangement provides for the use of a mathematical model of location and/or localised trigger methods. Having the mathematical model and the location technology available, the arrangement determines the project parameters in order to verify the given accuracy specifications depending on the assigned target area. The mathematical model and the mode used for obtaining it are also included within the scope of the present invention.

BRIEF DESCRIPTION OF THE ENCLOSED DRAWINGS

The invention will not be described, merely as a non-limiting example, with reference to the figures of the enclosed drawings, in which:

FIG. 1 schematically shows a typical application context of the herein described arrangement;

FIG. 2 shows an architectural diagram of an embodiment of the described arrangement;

FIGS. 3 to 7 show various geometric parameters which will be referred to in the following description;

FIG. 8 shows a descriptive example of a continuous area as set of square pixels;

FIG. 9 shows a descriptive example of a non-continuous area as set of square pixels;

FIG. 10 shows an example of real "target" area and detected "target" area;

FIG. 11 shows a sequence of steps for experimentally determining a mathematical model that can be used within the invention; and FIGS. 12 and 13 show an example of mathematical models for some below-described indicators.

DETAILED DESCRIPTION OF EMBODIMENTS OF THE INVENTION

As a general reference, aim of the herein described arrangement is determining whether a mobile terminal included in a communications network belongs to a given area.

A possible field of application of this arrangement is given by radio-mobile networks (for example GSM, UMTS, etc.) and by networks for which the terminal supports many protocols (mixed networks, for example UMTS/WLAN).

As an example, FIG. 1 refers to a generic communications network N comprising any number of terminals 100 connected to respective nodes 200, that are mutually interconnected in order to allow communications among the terminals 100.

To better state it, without limiting the invention in any way, it can be deemed that the communications network N is a cellular communications network (according to any known standard) comprising a plurality of base stations 200 (BTS, NodeB, . . . ) that are prone to serve the terminals 100.

Substantially similar considerations can be valid for a WLAN network, in particular for a so-called "hot spot" based on WLAN technology.

In any case, the representation in FIG. 1 is schematically and generic on purpose: this choice is given by the will of pointing out that the herein described arrangement is prone to be applied to any communications network.

As stated, the herein described arrangement fulfils the object of locating the terminals 100 in order to provide location-based services for the terminals 100 themselves.

The term "location" here means in general the placement of a given terminal 100 in a certain area or space A, called "target" area or space.

For such purpose, it will be appreciated that the network N must not necessarily be a mobile communications network as strictly defined. The possible change of terminals 100 location within the network N can in fact correspond both to the displacement of mobile terminals, and to a following different placement in different target spaces A of terminals 100 that per se cannot be identified as real mobile terminals.

Essentially, the described arrangement provides:

the determination of one or more "target" areas under a situation in which the or each area can have any shape. The described arrangement allows recognising at any time whether the user or mobile object are inside or outside a certain target area. It further allows generating trigger events every time the user or mobile object enters in, or goes out of, the "target" area;

the presence of "service specifications" (or "accuracy specifications") related to trigger accuracy. The available technologies have limited accuracies in that there is a non-null probability that the user is outside the "target" area though he is estimated inside, or that he is inside and is estimated outside.

FIG. 2 describes the logic-functional architecture of the herein described system, designated as a whole with S.

In particular, the affected logic-functional architecture provides for the suitably described "target" area 1 as input, with related accuracy specifications 2.

Input information (1 and 2) are processed by a module 3 for determining project parameters (or variables), that also uses information deriving from mathematical models or location technologies stored in a module 4.

In particular, module 4 is a data base that stores the mathematical models of a defined set of location technologies and/or localised triggers; advantageously, only one of such models will be chosen for implementing the method of the invention, as will be described in more detail below.

Module 3 generates one or more project parameters 10 (or "determination parameters", namely the parameters that, as will be better described below, are used for determining the target area) aimed to be passed to a module 5 that implements the location technology. After having received the determination or project parameters 10, the module 5 activates the analysis of detected information, schematically shown with 6, and determines output information 7 and/or 8.

Output 7 provides the indication of user position with respect to the "target" area that can be internal IN or external OUT. Output 8 further provides signals that indicate the user entry or exit from the "target" area. These entry/exit signals are trigger events for location-based services, such services being linked (in an immediate or delayed-in-time way) to the user entry or exit with respect to the "target" area.

The "target" area is the portion of the relevant geographical area, usually linked to the providing of a service based on the user position with respect to it.

In the present description, a generic reference has been and will be made to an "area" taken as "target". As regards this, it will be appreciated that the term "area" is here an example of a space that is adapted to be composed not only of a geographical area (two-dimensional space), but also of a delimited space (three-dimensional space) and, at least virtually, of a space with an elongated shape in which there is a single meaningful space coordinate (one-dimensional space).

The "target" space can then be defined in several ways. Herein below, as a non-limiting example, some methods are listed, that can be used for describing a "target" space; this reference does not exclude the use of any other method in implementing the invention.

As a first example, the "Geographical Area Description" (GAD) specifications can be mentioned: the 3GPP (Third Generation Partnership Project) standard with TS 23.032 specifications provides universal criteria for describing geographical areas inside the 3GPP system, thereby called GAD.

Some among the methods provided in GAD specifications are described herein below.

Ellipsoid Point with uncertainty circle: it is characterised by the coordinates (latitude and longitude) of a point on the ellipsoid (point P) and by a distance r. The criteria identify the area defined as the set of ellipsoid points that are at a distance from point P that is less than or equal to r. The distance is the geodetic distance on the ellipsoid taken on the path laying on the ellipsoid with a minimum length. FIG. 3 provides the representation of the Ellipsoid Point with uncertainty circle.

Ellipsoid Point with uncertainty ellipse: it is characterised by the coordinates (latitude and longitude) of a point on the ellipsoid (point P), by the distances r1 and r2 and by an orienting angle $\alpha$ (alpha), as shown in FIG. 4. The criteria identify the area defined as the set of ellipsoid points that fall within an ellipse whose longer semi-axis has a length r1 oriented with an angle $\alpha$ (included between 0 and 180°) taken clockwise with respect to north direction and shorter semi-axis equal to r2. The distances are geodetic distances on the ellipsoid taken on the path laying on the ellipsoid with minimum length.

Polygon: it is an arbitrary figure (polygon) described by a set of points. The minimum allowed number of points is three and the maximum number of allowed points is fifteen. The points are connected, in the order in which they are described, by lines on the ellipsoid in order to move along the minimum distance between the points. The last point is connected to the first. FIG. 5 shows an example of an area described with a polygon, where the points are designated with A, B, C, D, E.

Ellipsoid Point with altitude and uncertainty ellipsoid: it is characterised by the coordinates (latitude and longitude) of a point (point P) with related altitude, the distances r1 (longer semi-axis), r2 (shorter semi-axis), r3 (vertical uncertainty) and an orienting angle $\alpha$ (alpha), as shown in FIG. 6. The criteria identify the area defined as the set of points falling within the area delimited by the ellipsoid centred in point P placed at a certain altitude. The ellipsoid has an axis r3 that is vertically aligned while r1 is the longer ellipse semi-axis that lays on an horizontal plane that bisects the ellipsoid, and is oriented at an angle $\alpha$ (included between 0 and 180°) measured clockwise with respect to the north direction, and r2 is the shorter ellipse semi-axis that lays on an horizontal plane that bisects the ellipsoid.

Ellipsoid Arc: it is characterised by the coordinates of a point on the ellipsoid (point P), an internal radium r1, an uncertainty radium r2, both taken as geodetic distances on the ellipsoid surface, with indication of angle $\theta$ (theta) between radius r1 and north direction and angle $\beta$ (beta) between radius r1 and radius r2. FIG. 7 provides a representation of the Ellipsoid Arc.

A further example of the way of describing a "target" area is composed of a set of 2D pixels (two-dimensional space): it describes a target area through the set of pixels with defined shape and size described in the two-dimensional space. This method allows describing geographical areas with different shapes and even not continuous. FIG. 8 and FIG. 9 provide examples of areas described as set of pixels. FIG. 8 corresponds to a continuous area, FIG. 9 corresponds to a non-continuous area.

A still further example of the way of describing a target space is composed of a set of 3D pixels (three-dimensional space): it describes a "target" space by means of the set of pixels with a defined shape and size described in the three-dimensional space. This method allows describing "target" spaces in the three-dimensional space with different and even non-continuous shapes.

The second set of entry data used in the herein described arrangement is given by the accuracy specifications, designated with 2 in the diagram in FIG. 2.

The accuracy specifications describe the accuracy with which it is desired to locate the "target" area (or, more generally, the zone or space). The accuracy specifications can be different for different "target" areas.

As already explained in the introductory part of the present description, the available technologies for determining the user position related to a "target" area have limited accuracies. This since there is a non-null probability that the user is outside the "target" area but is estimated inside, or that he is inside and is estimated outside.

FIG. 10 shows as an example a situation in which reference 11 designates the relevant "target" area while reference 12 designates the geographic area that is detected by the location method or the localised trigger. As can be observed, the two areas 11 and 12 are not identical and are only partially coincident.

In practice, only part of the real "target" area 11 is recognised, while part of the detected geographical area 12 is external to the "target" area 11.

Therefore, there is a part 11a of the "target" area 11 such that, if the user is inside it, he is detected as outside and a geographical area 11b outside the "target" area 11, for which if the user is inside, he is detected as inside.

The example in FIG. 10 makes one understand that, in general, given a "target" area, the location method or the localised trigger do not recognise a certain geographical area in a well delimited way.

Therefore, it happens that positions inside the "target" area are detected with an error probability P(e|in) as external positions, and positions outside the "target" area are detected as positions inside the "target" area with probability P(e|out). In particular:

P(e|out) is the probability that a position outside the "target" area is detected as inside the "target" area;

P(e|in) is the probability that a position inside the "target" area is detected as outside the "target" area.

The two probabilities P(e|out) and P(e|in) can be used as indicators through which it is possible to provide the accuracy specifications. Obviously, any other type of accuracy indicator can be used.

As a non-limiting example, the case is described in which P(e|out) and P(e|in) are the indicators used for providing the accuracy specifications.

Let then A be an area (or, in general, a space) with an enough big reference to contain the "target" area (or, in general, the space) and the possible geographical area (or, also here, more in general, the space) detected by the chosen location method or localised trigger) and let $A_t$ be the "target" area.

Let g(P) designate the probability that the generic point P is detected inside. It is possible to define these two indicators in the continuous domain with:

$$P(e\mid\text{out}) = \frac{1}{A}\int_{A-A_1} g(P)\,da \quad (1)$$

where da is the elementary area.

$$P(e\mid\text{in}) = \frac{1}{A}\int_{A_1} 1 - g(P)\,da \quad (2)$$

where (1−g(P)) is the probability that point P (inside the "target" area) is deemed as outside.

In the discrete domain, the same indicators can be represented as:

$$P(e\mid\text{out}) = \frac{1}{A}\sum_i g(a_i)\Delta a_i \quad (3)$$

where:

$g(a_i)$ is the probability that pixel $a_i$ outside the "target" area is considered as inside;

$\Delta a_i$ is the area of pixel i.

$$P(e\mid\text{in}) = \frac{1}{A}\sum_i 1 - g(a_i)\Delta a_i \quad (4)$$

where:

$(1-g(a_i))$ is the probability that pixel $a_i$ inside the "target" area is considered as outside;

$\Delta a_i$ is the area of the pixel i.

Another example of indicators that can be used for providing the accuracy specifications are P(e|in) and r:

P(e|in), as previously defined.

r, defined as ratio between the area detected as belonging to the "target" area and the actual "target" area.

(5)

In the representation in FIG. 10, r is the ratio between area 12 and area 11.

Or, in the non-deterministic case, r can be defined as:

$$r = \frac{1}{A_t}\int g(P)\,da \quad (6)$$

where the integral must be meant as extended to the whole space. This integral too can be evaluated in a discrete form if the values of g(P) are known only for some points.

The desired accuracy specifications can then be provided as system input by establishing values, or ranges of values, for the above-mentioned indicators.

For example, it is possible to point out whether a value is desired that is equal to P1 for P(e|in) and greater than P2 for P(e|out), or greater than and equal to P3 for P(e|in) and less than P4 for r. Moreover, it is possible to point out that it is desired to give priority to one of the accuracy indicators provided as input. For example, for a certain service, it can be more important to guarantee that the probability P(e|in) is exactly the pointed-out one or is within the pointed-out range, while the probability P(e|out) can be deemed as less important. In such case, the indicator P(e|in) will be pointed out as priority. Such priority will then be useful for determining the project parameters, as will be described below.

After having received as inputs the "target" area 1 and the accuracy specifications 2, module 3 queries module 4 (that, as already previously stated, stores the mathematical models that describe the location methods and/or the localised triggers) in order to know whether, among the stored models, there is at least one that allow satisfying, after having fixed the "target" area, the above accuracy specifications. If there are many models that satisfy the accuracy specifications, the choice among them can be made, also automatically, depending on another criteria, for example depending on implementing costs for the corresponding location techniques and/or localised triggers.

The mathematical models are stored in module 4 as one or more functions that, for the chosen location method and/or the localised triggers, correlate the project parameters 10, that can be represented, for example, by a vector P (with one or more values), with the parameters identifying the "target" space and with all indicators describing the accuracy specifications 2.

For example, the mathematical model can comprise a first function that correlates P(e|in) with the "target" area and with P, and a second function that correlates P(e|out), or r, with the "target" area and with P.

Taking into account, as an example, the above-described indicators: P(e|out) and P(e|in), it is possible to describe the generic localisation technique with a mathematical model of the type:

$$P(e|\text{out})=F(\underline{P},\text{AreaTarget}) \quad (7)$$

$$P(e|\text{in})=G(\underline{P},\text{AreaTarget}) \quad (8)$$

where $\underline{P}$ is the project parameters vector.

Depending on such functions, module 3 is able to establish whether there is a model that complies with the imposed requirements ("target" area and accuracy parameters) and, therefore, whether there is a localisation method and/or localised triggers adapted for such purpose. If there is more than one model that satisfies such requirements, one will be chosen depending on predetermined criteria, for example depending on location technology implementing costs.

Once having chosen the model, module 3 is able to determine the project parameters P for the corresponding location method and/or localised triggers. For such purpose, module 3 can also exploit the priority indication related to the accuracy parameters. In practice, the project parameters P will be established through the function linking the project parameters themselves to the "target" area and the priority accuracy parameter.

For example, if P(e|in) is deemed as the priority accuracy parameter and as input conditions AreaTarget=At and P(e|in)≦P1 are set, the vector $\underline{P}$ will be established depending on the relationship:

$$G(\underline{P}, At) \leq P1.$$

The project parameters $\underline{P}$ will then be determined depending on the above functions and the priority indicated as regards the indicators describing the accuracy specifications 2.

The mathematical models can be built in different ways, such as theoretical studies, simulations, collection of real information and experimental studies.

As a non-limiting example, a method is described below (not previously dealt with in the art) for determining the mathematical models, realised through the collection of real information.

This method consists in the:

collection of data used by location methods and/or by localised triggers, directly from the real world. The data collection is performed by means of experimental tests (trials) in which the quantities are measured that are used by the location methods and/or by the localised triggers for which the mathematical model has to be determined. The number of measures and the distribution of measuring points on the territory are such as to statistically characterise the behaviour of the measured quantities. The measuring points cover geographic areas with different morphologic characteristics. Every measure is geo-referenced;

processing of collected data—the collected measures are processed in order to generate the mathematical model of the location method and/or the localised trigger. Processing is performed by examining the behaviour of the location method and/or the localised trigger for a consistent number of "target" areas with different sizes and placed in geographical areas with different morphologic characteristics. This processing allows for example to determine the mathematical model described by:

$$P(e|out) = F(\underline{P}, \text{AreaTarget}) \quad (9)$$

$$P(e|in) = G(\underline{P}, \text{AreaTarget}) \quad (10)$$

FIG. 11 shows the method for determining the mathematical model through the collection of real information. In step 13 the collection of real data is performed, such data being used by the location method and/or the localised trigger to estimate the position with respect to the "target" area. In step 14 the collected information are processed in order to locate the mathematical model 15.

However, as already pointed out, the described arrangement can use any location method and/or localised trigger.

For every location method or localised trigger, it is possible to locate one or more project parameters (in general there will be a vector P of project parameters) through which it is possible to satisfy the accuracy specifications (obviously remaining within the accuracy limits imposed by the examined location technology).

Herein below some area recognition technologies, not previously documented in the art, will be examined.

The location whether one belongs to a certain "target" area through a location technology (in the examined case, the location technology DFL disclosed in U.S.2004058691 will be taken into account) occurs by evaluating whether the coordinates estimated by the above method fall or not within an area called "fictitious target area".

The recognition of "target" areas by using the location method DFL consists in:

i) periodically locating the mobile terminal; location is performed by collecting from the terminal the measures Cell ID, NMR and, if available, Time Advance, and through the location motor DFL the estimated position is determined. The periodicity with which the location is performed is chosen depending on the required speed in recognising entry or exit from the "target" area;

ii) verifying whether the estimated position in the previous step is within a "fictitious target area" having as centre the "target" area centre and radius equal to "d", where d is the project parameter;

iii) providing outputs 7 and/or 8 in FIG. 2. Output 7 indicates the updated information upon every location of the position detected as IN (inside the "target"), OUT (outside the "target"). Output 8 indicates the possible status change from a position inside the "target" area to one outside it or vice versa.

The determination of the mathematical model for this location technology is advantageously performed by analysing its behaviour on real data (as already previously described):

measures are collected that are used by the location method DFL (CellID, NMR, TA) for a set of statistically georeferenced points consisting in:

the collected measures are processed in order to generate the mathematical model. Processing is performed by examining, for a consistent number of "target" areas with different sizes and placed in geographical areas with different morphologic characteristics. The study is performed by varying, with the same "target" area, the size of d, project parameter. This processing allows determining the mathematical model given by:

$$P_{DFL}(e|in) = G_{DFL}(d, \text{AreaTarget}) \quad (11)$$

$$r_{DFL} = F_{DFL}(d, \text{AreaTarget}) \quad (12)$$

where:

$P_{DFL}$ (e|in) is the probability that a position inside the "target" area is detected as outside the "target" area, for the location method DFL;

$r_{DFL}$ between geographical area detected as area belonging to the "target" area and actual "target" area, for the location method DFL;

d is the project variable and represents the radius that, together with the centre of the "target" area, describes the area in which the position estimated by the DFL must fall to declare that the position is inside the "target" area.

FIGS. 12 and 13 show a representation of $P_{DFL}$ (e|in), with a value that is obviously included between 0 and 1, and $r_{DFL}$ upon the increase of d (in meters) for a circular "target" area with radius equal to 500 m in an urban area.

Assuming, for example, that module 3 has chosen the DFL method among the different methods stored in module 4 and that P(e|in) is deemed the priority accuracy parameter, the determination of d can be performed depending on the graph in FIG. 12, choosing that value which best satisfies the requirements on P(e|in). For example, if it is necessary to have P(e|in)≦0.2, d will be chosen equal to 500 (in this particular case, d coincides with R).

The localised trigger technology based on Cell ID consists in locating, given a "target" area, a set of cell identifiers whose areas best cover the "target" area. The set of cells is chosen in such a way that a spot inside the "target" area is recognised as such in the majority of cases and vice versa for the spots outside the "target" area.

The recognition of "target" areas using the localised trigger based on Cell ID comprises the following steps:
- choice of the set of cells whose areas best cover the "target" area. The method consists, for example, in choosing the cells with barycentre inside an area having as centre the "target" area centre and radium d; d is the project parameter and the barycentre of a cell is considered, for example, as:
  - in case of an omni-directional cell, the geographic spot in which the cell site has its seat;
  - in case of an unidirectional cell, the geographic spot located taking into account, along the maximum cell gain direction, the geographic spot that is at a certain distance from the geographic spot in which the cell site has its seat, equal to half the distance between the geographic spot in which the cell site, whose barycentre has to be known, has its seat, and the geographic spot in which the nearest cell site has its seat;
- after having determined the set of cells covering the "target" area, in order to examine whether the spot is inside the "target" area, it is enough to verify whether the serving cell detected in such spot is a cell belonging to the chosen set;
- providing outputs 7 and/or 8 in FIG. 2. Output 7 indicates the updated information upon every detection of the position detected as IN (inside the "target"), OUT (outside the "target"). Output 8 indicates the possible status change from a position inside the "target" area to one outside or vice versa.

Also for this localised trigger technology, the determination of the mathematical model is preferably performed by analysing its behaviour on real data (as described previously):
- measures are collected that are used by the localised trigger (serving Cell ID) for a set of statistically geo-referenced points consisting in:
- collected measures are processed in order to generate the mathematical model. Processing is performed by examining the behaviour for a consistent number of "target" areas with different sizes and placed in geographical areas with different morphologic characteristics. The study is performed by varying, with the same "target" area, the size of d, project parameter.

This processing allows determining the mathematical model given by:

$$P_{CellID}(e|in) = G_{CellID}(d, \text{AreaTarget}) \quad (13)$$

$$r_{cellID} = F_{CellID}(d, \text{AreaTarget}) \quad (14)$$

where:
- $P_{CellID}$ (e|in) is the probability that a position inside the "target" area is detected as outside the "target" area, for the localised trigger based on Cell ID;
- $r_{cellID}$ ratio between geographical area detected as area belonging to the "target" area and actual "target" area, for a localised trigger based on Cell ID;
- d is the variable representing the radium that, together with the target centre, describes the area in which the cell barycentre must fall to be deemed belonging to the set of cells covering the "target" area.

It is also possible to proceed with the recognition of "target" areas by using a localised trigger based on neural networks.

A localised trigger based on neural networks consists in recognising a "target" area using the neural networks. The used neural network has as input nodes a number of input neurons, each one of which is associated with a well defined transmitting cell, and as output node the output neuron that provides the recognition result.

The recognition of "target" areas using the localised trigger based on neural networks comprises the following steps:
  i) given a "target" area a neural network is trained to recognise the "target" area itself, in a simulated environment, such network having as input nodes a number of nodes equal to Nin. Training in a simulated environment consists in provided the network with a set of spots inside and outside the "target" area with indication of cells and related powers (Cell-ID and NMR) simulated in the affected spots and with the indication of inside/outside the "target" area for every spot;
  ii) the trained neural network is able to examine whether the position is inside or outside the "target" area. Providing the neural network input nodes with the amounts measured in the various spots (Cell-ID and NMR) the neural network estimates whether the measured spot is inside or outside the "target" area;
  iii) providing outputs 7 and/or 8 in FIG. 2. Output 7 indicates the updated information upon every detection of the position detected as IN (inside the "target"), OUT (outside the "target"). Output 8 indicates the possible status change from a position inside the "target" to one outside or vice versa.

The determination of the mathematical model for this localised trigger technology can be performed by analysing its behaviour on real data (as already described previously).

In a typical embodiment, the steps are as follows:
- measures are collected that are used by the localised trigger (Cell ID and NMR) for a set of statistically coherent and geo-referenced points;
- collected measures are processed in order to generate the mathematical model. Processing is performed by examining the behaviour for a consistent number of "target" areas with different sizes and placed in geographical areas with different morphologic characteristics. The study is performed by varying, with the same "target" area, the size of Nin, project parameter.

This processing allows determining the mathematical model given by:

$$P_{neural}(e|in) = G_{neural}(Nin, \text{AreaTarget}) \quad (15)$$

$$r_{neural} = F_{neural}(Nin, \text{AreaTarget}) \quad (16)$$

where:
- $P_{neural}$ (e|in) is the probability that a position inside the "target" area is detected as outside the "target" area, for the localised trigger based on neural networks;
- $r_{neural}$ is the ratio between the geographical area detected as area belonging to the "target" area and the actual "target" area, for a localised trigger based on neural networks;
- Nin is the project variable and represents the number of neural network input-nodes.

The use of the herein described arrangement allows defining, depending on the localised service that has to be provided to a user, in addition to the "target" area, in which the service must be available, also the accuracy specifications, that point out with which tolerance the service can be provided.

Managing the accuracy specifications by determining the suitable project parameters allows having a check on the quality of the service offered to a user.

Using the described arrangement it is possible, for example, to:
- provide safety services by calibrating the quickness with which the output from the "target" area must be detected. It is possible to manage the compromise between percentage of false alarms that one accepts to receive and the speed with which a real alarm must be detected;
- in applications in the advertising sector, it is possible to send advertising only if one is almost sure that the user is really in the "target" area. Receiving advertisements when this has not been requested can be deemed a strong disturbance by a user. In this case it is possible to set restrictive service (or accuracy) specifications that allow having the maximum probability that advertising is detected only if the user is in the designated "target" area as compared to a loss of advertising percentage due to the lack of a detection in the "target" area;
- manage different cases within a given type of service. For example, the differential billing, by applying in some cases only if one is sure that the user is inside the given "target" area (case in which in a given critical area an increased fare is applied), by setting for such purpose restrictive accuracy specifications; in other cases, in which it is desired to be sure not to detect as outside users that are inside the "target" area (case in which in a given area a reduced fare is applied), accuracy specifications will be set that favour the detection in the "target" area.

In general, it is possible to better manage the location-based services by allowing the service manager to calibrate the accuracy specifications depending on the service supply mode.

It is also clear that, without departing from the principles of the invention, the constructive parts and the embodiment can change, even greatly, with respect to what has been described and shown, merely as a non-limiting example, without thereby departing from the scope of the invention, as defined by the following claims.

For example, the accuracy specifications could be provided by pointing out the required value, or the required value range, for a single accuracy indicator, chosen among P(e|in), P(e|out) and r, or of a different type.

The invention claimed is:

1. A method for determining whether at least one terminal belongs to a target space in a communications network in order to provide a set of services linked to the fact that said terminal belongs or does not belong to said target space, said belonging being determined depending on at least one determination parameter, comprising:
   associating, with a first service of the set of services, a service specification indicative of a first allowable error margin in determining whether said terminal belongs or does not belong to said target space;
   associating, with a second service of the set of services, a service specification indicative of a second allowable error margin in determining whether said terminal belongs or does not belong to said target space; and
   varying said at least one determination parameter depending on said service specifications.

2. The method according to claim 1, further comprising:
   determining at least one indicator selected from:
   i) the probability that said at least one terminal placed outside said target space is detected as placed inside said target space, and
   ii) the probability that said at least one terminal placed inside said target space is detected as placed outside said target space; and
   determining said service specifications depending on said at least one indicator.

3. The method according to claim 1, further comprising:
   determining at least one indicator selected from:
   i) the probability that said at least one terminal placed inside said target space is detected as placed outside said target space, and
   ii) the ratio between the size of the space detected as space belonging to said target space and the actual size of said target space; and
   determining said service specifications depending on said at least one indicator.

4. The method according to claim 1, further comprising generating a signal that indicates the passage of said at least one terminal between inside and outside said target space.

5. The method according to claim 1, further comprising determining said service specifications as a model.

6. The method according to claim 5, wherein said model is based on:
   the probability that said at least one terminal placed inside said target space is detected as placed outside said target space;
   the ratio between the size of the space detected as space belonging to said target space and the actual size of said target space; and
   a radial size that, together with the target space centre, describes the space in which the estimated position of said at least one terminal must be located, so that said at least one terminal is detected inside said target space.

7. The method according to claim 5, further comprising generating said model through:
   collecting experimental data from geo-referenced measures of quantities used by the location methods and/or the localized triggers in a plurality of target spaces having at least one different size or morphologic characteristic within said communications network; and
   processing data collected in order to generate said model.

8. The method according to claim 7, further comprising:
   periodically determining, in following estimation times, the estimated position of said at least one terminal;
   verifying whether the estimated position in the previous estimation time is inside a space having as a centre the centre of said target space and a given radial size; and
   generating at least one signal that provides updated information of the result of said step of verifying.

9. The method according to claim 8, wherein said step of verifying is performed with a periodicity chosen depending on the required speed in recognizing the entry or exit of said at least one terminal with respect to said target space.

10. The method according to claim 6, further comprising:
configuring said communications network as a cellular communications network comprising a plurality of cells that are subjected to serve said at least one terminal;
identifying, within said plurality, a set of cells with barycentre inside a space whose centre is in the centre of said target space and radius equal to said radial size; and
estimating whether said at least one terminal is in said target space, verifying whether the cell of said cellular communications network that at that time serves said at least one terminal is a cell belonging to the identified set.

11. The method according to claim 10, wherein the following are considered as barycentre of a cell of said set:
in case of an omni-directional cell, the geographic spot in which the cell site has its seat; and
in case of a unidirectional cell, the located geographic spot, considering along the maximum cell gain direction, the geographic spot that is at a distance from the geographic spot in which the cell site has its seat, equal to half the distance between the geographic spot in which the cell site has its seat, whose barycentre has to be known, and the geographic spot in which the nearest cell site has its seat.

12. The method according to claim 1, further comprising:
configuring said communications network as a cellular communications network comprising a plurality of cells that are subjected to serve said at least one terminal;
generating a neural network having, as input nodes, input neurons each one of which is associated with one of the cells of said plurality and, as output node, an output neuron that provides the result of the detection whether said at least one mobile terminal belongs to one of the cells of said plurality.

13. The method according to claim 12, further comprising training said neural network having a given number of input nodes, to recognize a given target space providing to the neural network a set of points inside and outside the target space itself, with an indication of the cells of said plurality and the related simulated powers in the spots of said set and with an indication that said at least one terminal is inside or outside the target space for every spot in said set.

14. The method according to claim 13, further comprising:
providing the input nodes of said neural network with homologous power values detected in the spot in which said at least one terminal can be found, so that said neural network estimates whether said at least one terminal is inside or outside with respect to the target space; and
generating at least one signal that provides information related to the fact whether said at least one terminal is inside or outside with respect to the target space.

15. The method according to claim 12, further comprising:
determining with said target space, at least one indicator selected from:
i) probability that said at least one terminal located in said target space is detected by said neural network as placed outside said target space; and
ii) ratio between the size of the space detected by said neural network as space belonging to said target space and the actual size of said target space; and
determining the number of input nodes of said neural network depending on said at least one indicator.

16. A method for determining whether at least one terminal belongs to a target space in a communications network in order to provide a set of services linked to the fact that said terminal belongs or does not belong to said target space, said belonging being determined by:
associating, with a first service of the set of services, a service specification indicative of a first allowable error margin in determining whether said terminal belongs or does not belong to said target space; and
associating, with a second service of the set of services, a service specification indicative of a second allowable error margin in determining whether said terminal belongs or does not belong to said target space.

17. A system for determining whether said at least one terminal belongs to a target space in a communications network in order to provide a set of services linked to the fact that said terminal belongs or does not belong to said target space, said belonging being determined depending on at least one determination parameter, the system being configured to perform a method comprising:
associating, with a first service of the set of services, a service specification indicative of a first allowable error margin in determining whether said terminal belongs or does not belong to said target space;
associating, with a second service of the set of services, a service specification indicative of a second allowable error margin in determining whether said terminal belongs or does not belong to said target space; and
varying said at least one determination parameter depending on said service specifications.

18. A communications network configured in order to provide services based on whether a terminal belongs or does not belong to a target space, the network comprising a system for determining whether said at least one terminal belongs to a target space in a communications network in order to provide a set of services linked to the fact that said terminal belongs or does not belong to said target space, said belonging being determined depending on at least one determination parameter, the system being configured to perform a method comprising:
associating, with a first service of the set of services, a service specification indicative of a first allowable error margin in determining whether said terminal belongs or does not belong to said target space;
associating, with a second service of the set of services, a service specification indicative of a second allowable error margin in determining whether said terminal belongs or does not belong to said target space; and
varying said at least one determination parameter depending on said service specifications.

19. A cellular communications network comprising a communications network comprising a plurality of cells that are subjected to serve said at least one terminal and configured to provide services based on whether a terminal belongs or does not belong to a target space, the network comprising a system for determining whether said at least one terminal belongs to a target space in a communications network in order to provide a set of services linked to the fact that said terminal belongs or does not belong to said target space, said belonging being determined depending on at least one determination parameter, the system being configured to perform a method comprising:
associating, with a first service of the set of services, a service specification indicative of a first allowable error margin in determining whether said terminal belongs or does not belong to said target space;
associating, with a second service of the set of services, a service specification indicative of a second allowable error margin in determining whether said terminal belongs or does not belong to said target space; and
varying said at least one determination parameter depending on said service specifications.

20. A computer-readable medium adapted to be loaded in the memory of at least one processor and comprising portions of software code capable of performing a method for determining whether at least one terminal belongs to a target space in a communications network in order to provide a set of services linked to the fact that said terminal belongs or does not belong to said target space, said belonging being determined depending on at least one determination parameter, comprising:

associating, with a first service of the set of services, a service specification indicative of a first allowable error margin in determining whether said terminal belongs or does not belong to said target space;

associating, with a second service of the set of services, a service specification indicative of a second allowable error margin in determining whether said terminal belongs or does not belong to said target space; and varying said at least one determination parameter depending on said service specifications.

21. The method according to claim 1, wherein the service specification includes a threshold parameter indicative of a level of certainty or uncertainty in a location of the at least one terminal.

22. The method according to claim 1, wherein the service specification includes a threshold parameter indicative of an acceptable delay in reporting entry into or exit from the target space by the at least one terminal.

* * * * *